United States Patent [19]
Sbarra et al.

[11] 4,121,354
[45] Oct. 24, 1978

[54] ANIMATED LEARNING AID

[76] Inventors: Frank Sbarra; Linda J. Velardo, both c/o George Spector, 3615 Woolworth Building, 233 Broadway; George Spector, 3615 Woolworth Building, 233 Broadway, New York, N.Y. 10007

[21] Appl. No.: 680,762

[22] Filed: Apr. 27, 1976

[51] Int. Cl.² .............................................. G09B 7/10
[52] U.S. Cl. .................................................... 35/9 C
[58] Field of Search ................. 35/9 R, 9 B, 9 C, 9 D

[56] References Cited
U.S. PATENT DOCUMENTS

| | | | |
|---|---|---|---|
| 309,064 | 12/1884 | Kinch | 35/9 C |
| 1,860,895 | 5/1932 | Marx | 35/9 C |
| 2,275,988 | 3/1942 | Parker | 35/9 C |
| 3,362,103 | 1/1968 | Neumann | 35/9 R X |
| 3,902,256 | 9/1975 | Liu | 35/9 D |

*Primary Examiner*—William H. Grieb

[57] ABSTRACT

An educational device for teaching facts to children in a manner that is pleasant to them by incorporating physical activity upon their part; the device including an upstanding large display board having a row of questions and also a row of answers to these questions mounted on a front side, a contact button alongside each question and each answer, the child holding in each hand a contact probe for each selection being contacted to the contact buttons associated with a correct answer to a question, the probes thus closing an electric circuit on a rear side of the panel that includes a low voltage dry cell battery and motor that activates an animated display upon a front side of the board such as a windmill having rotatable wind vanes, so the child sees that he had identified a correct answer to a specific question.

2 Claims, 7 Drawing Figures

U.S. Patent   Oct. 24, 1978   4,121,354
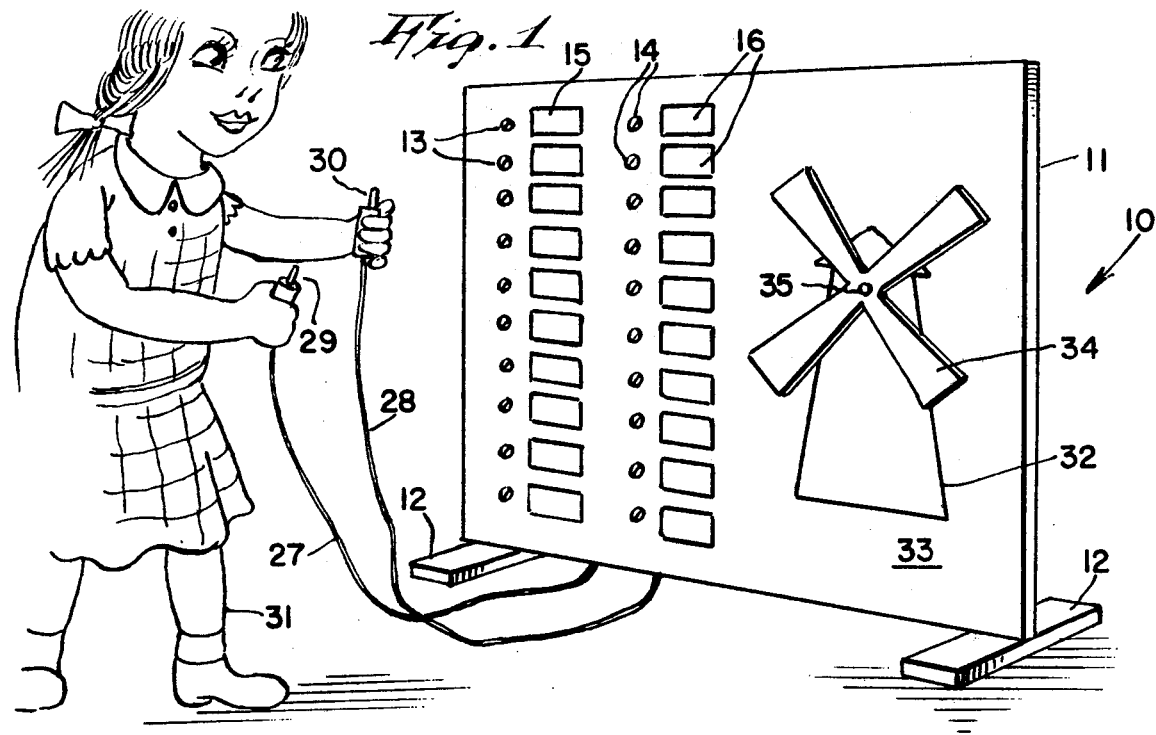
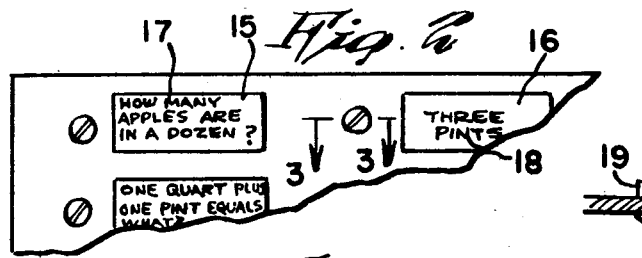
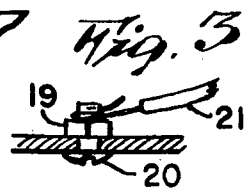
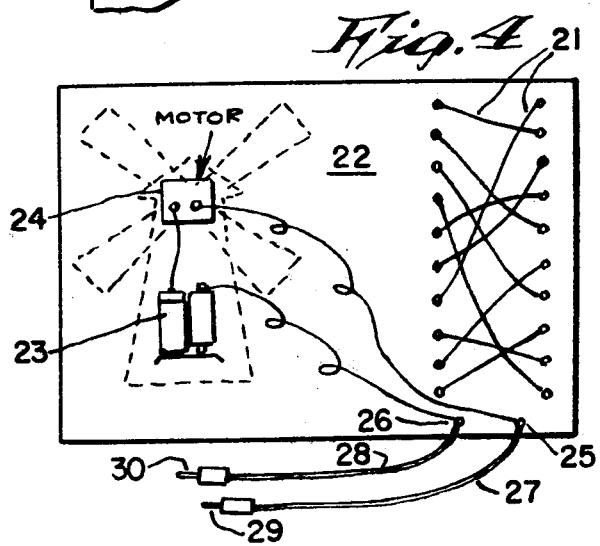
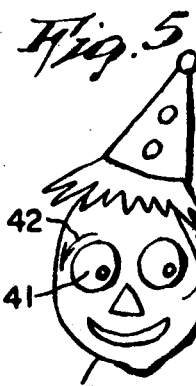
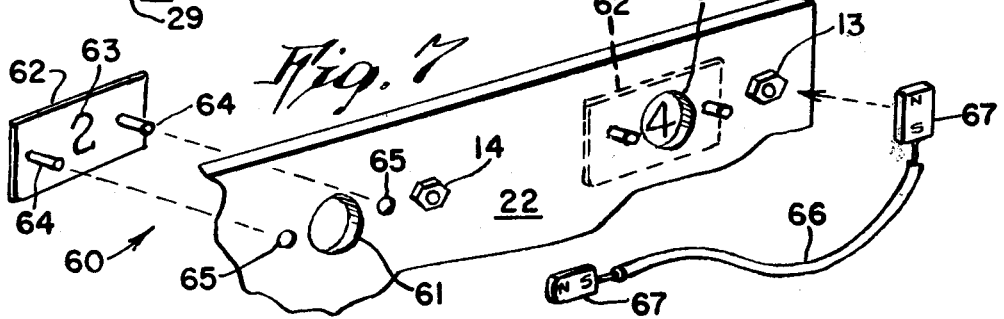

ANIMATED LEARNING AID

This invention relates generally to educational devices.

A principal object is to provide an educational device particularly for children because it additionally includes physical activity on the part of a child, and entertains visually when a correct answer is made.

Another object is to provide an animated learning aid which can be made on a scale so that it can be used in front of a class room of little children.

Yet another object is to provide an amimated learning aid which could be retailed either fully assembled or as kits that could be assembled easily by purchasers.

Other objects are to provide an animated learning aid which is simple in design, inexpensive to manufacture, rugged in construction, easy to use and efficient in operation.

These and other objects will be readily evident upon a study of the following specification and the accompanying drawing wherein:

FIG. 1 is a front perspective view of the invention.

FIG. 2 is an enlarged detail of the front side thereof.

FIG. 3 is a cross section on line 3—3 of FIG. 2.

FIG. 4 is a view of a rear side of the invention.

FIG. 5 and FIG. 6 show alternate designs of mechanisms driven by the completed circuit FIG. 5 showing a clown head with rotatable eyes and FIG. 6 showing a figure with a pivotable hammer so to strike a lever that thrusts a block upward along a string so to strike a bell.

FIG. 7 shows another design of the invention which makes its easier for a teacher to properly relocate the question and answer plates, in case children get too familiar with positions that operate instead knowing the correct answers; a rear side of each question card having a number that is a same as a corresponding answer card, the numbers being visible on a rear side of the panel through panel windows, and the interconnecting jumper wire having a magnet at each end for quick and easy connection to the bolts.

Referring now to the drawing in greater detail, and more particularly to FIGS. 1 through 4 at this time, the reference numeral 10 represents an animated learning aid according to the present invention wherein there is a vertical board 11 supported upon feet 12, the board having two rows of electrical contacts 13 and 14, exposed upon its front side, and a space adjacent each contact for a question card 15 alongside each contact 13 and an answer card 16 alongside each contact 14. Each question card has a different question 17 printed or written thereupon, which each answer card has a different answer 18 printed or written thereupon.

Each contact consists of a nut 19 fitted on a bolt 20 that extends through the board, the rear sides of the contacts 13 and 14 being interconnected by jumper wires 21, each of which connects a contact of a question to a correct answer to the particular question. The positions of the questions and respective answers are scrambled, instead of being aligned with each other, so that a child must depend on his owner knowledge only to associate a question with a correct answer. Accordingly, as shown in FIG. 4, the jumper wires cross each other at random between the two rows of contacts.

On a rear side 22 of the board, there is mounted a set of dry cell batteries 23 and an electric motor 24 which are in series with a pair of contacts 25 and 26 from which a pair of leads 27 and 28 extend freely so that they are brought around in front of the board, the ends of the leads each being fitted with a contact probe 29 or 30.

In use, a child 31 holds a probe in each hand, and after reading a question and reading the various answers, he decides on which is the correct answer for the specific question. He then touches with one probe the contact of the question and with the other probe touches the contact of the selected answer. If the answer is correct, the child thus closes an electric circuit to the motor. A display 32 such as for example, a windmill upon a front side 33 of the board includes wind vanes 34 mounted on a shaft 35 of the motor so that the powered motor causes the vanes to rotate, making a pleasing, animated show.

In FIGS. 5 and 6 different designs of displays are shown for substitution of the windmill design. Thus in FIG. 5, a clown head 40 includes eyes 41 that are rotated by the motor as indicated by arrows 42. In FIG. 6, a clown 50 swings a hammer 51 against the action of a return spring 52, causing the hammer to strike one end of a lever 53 pivoted upon fulcrum 54 so to cause the other end of the lever to thrust a block 55 upwardly along a wire 56 so to strike a bell 57.

In FIG. 7, another design 60 of the invention incorporates an easy manner for a teacher to quickly and easily associate each question with its correct answer after having re-shuffled the cards so that children must rely on learning the correct answer instead of memorizing the positions of the associated cards respective to each other. The teacher working on the rear side of the board relocating the jumper wires, does not have to look at the front side of the cards to make the proper jumper wire connections. Instead she simply looks through holes 61 through the board and sees the rear sides of the cards 62 where each card has a numeral 63 for associating with another card having a same numeral. Thus relocating the question and answer cards is quickly accomplished. A pair of pegs 64, projecting from a rear of each card, are receivable in openings 65 of the board for support of the card thereupon.

Additionally, as shown in FIG. 7, the jumper wires 66 can include a permanent magnet 67 at each end for quick and easy connection to the contacts 13 and 14, which is more effortless to do than the wire connection shown in FIG. 3.

Thus different forms of the invention are presented.

While various changes may be made in the detail construction it is understood that such changes will be within the spirit and scope of the present invention as is defined by the appended claims.

What is claimed is:

1. In an animated learning aid, the combination of a board mounted upon feet, a row of question cards and a row of answer cards mounted on a front side of said board, an electrical contact adjacent each of said cards, each contact comprising a nut on a bolt extending from said front to a rear side of said board, and a plurality of jumper wires each of which is connected at one end to one said contact adjacent one said question card and an opposite end of said jumper wire is detachably connected to one said contact adjacent a correct said answer card; a battery and an electric motor secured to said rear side of said board, said board front side also having a design thereupon, said motor having a motor shaft through said board connected to a movable part in front of said design for giving animation to said design, and a pair of wire leads connected in series with said motor and battery, one end of each said lead having a contact probe for selective engagement with said board contacts, for closing a circuit to said battery and motor, wherein each said card includes a pair of rearward pegs receivable in openings in said board for support therefrom, a rear side of each said card being numerically identified which is visible from the rear through a hole through said board.

2. The combination as in claim 1 wherein each end of each said jumper wire is fitted with a permanent magnet.

* * * * *